(12) United States Patent
Ahrens et al.

(10) Patent No.: US 8,294,474 B2
(45) Date of Patent: Oct. 23, 2012

(54) DEVICE FOR SENSING A FAULT CURRENT IN A FIELD BUS SYSTEM

(75) Inventors: Olaf Ahrens, Giesen (DE); Jürgen Bode, Schellerten/Dinklar (DE); Jens Frühauf, Gronau (DE); Andreas Goers, Pattensen (DE)

(73) Assignee: WABCO GmbH, Hannover (DE)

( * ) Notice: Subject to any disclaimer, the term of this patent is extended or adjusted under 35 U.S.C. 154(b) by 683 days.

(21) Appl. No.: 12/311,638

(22) PCT Filed: Aug. 4, 2007

(86) PCT No.: PCT/EP2007/006907
§ 371 (c)(1),
(2), (4) Date: Apr. 6, 2009

(87) PCT Pub. No.: WO2008/043404
PCT Pub. Date: Apr. 17, 2008

(65) Prior Publication Data
US 2010/0033163 A1     Feb. 11, 2010

(30) Foreign Application Priority Data
Oct. 11, 2006   (DE) .................... 10 2006 048 073

(51) Int. Cl.
*G01R 31/02*     (2006.01)
(52) U.S. Cl. ................. 324/539; 324/543; 324/522
(58) Field of Classification Search ............... 324/76.11
See application file for complete search history.

(56) References Cited

U.S. PATENT DOCUMENTS

| | | | |
|---|---|---|---|
| 6,034,995 A * | 3/2000 | Eisele et al. ................. | 375/257 |
| 6,400,163 B1 * | 6/2002 | Melcher et al. ............... | 324/713 |
| 6,418,550 B1 | 7/2002 | Heinrich | |
| 7,142,951 B2 * | 11/2006 | Pincu et al. ................... | 700/297 |
| 7,436,290 B2 * | 10/2008 | Williams et al. .............. | 340/438 |
| 2003/0040149 A1 * | 2/2003 | Kasai ............................ | 438/200 |
| 2004/0088631 A1 * | 5/2004 | Blank ............................ | 714/746 |
| 2004/0227522 A1 * | 11/2004 | Male ............................. | 324/524 |
| 2006/0166706 A1 * | 7/2006 | Dwelley et al. ............... | 455/572 |
| 2007/0086135 A1 * | 4/2007 | Swartzendruber et al. ..... | 361/90 |

FOREIGN PATENT DOCUMENTS

DE            195 23 031 A1     12/1996
* cited by examiner

*Primary Examiner* — Timothy J Dole
(74) *Attorney, Agent, or Firm* — Kramer Levin Naftalis & Frankel LLP

(57) ABSTRACT

An electrical switching circuit for operating a bus of a field bus system senses a fault current based on a first current of a first bus line and a second current of a second bus line.

16 Claims, 5 Drawing Sheets

DEVICE FOR SENSING A FAULT CURRENT IN A FIELD BUS SYSTEM

FIELD OF THE INVENTION

The present invention generally relates to embodiments of an electrical switching circuit for determining a fault in a bus system and a corresponding method of use.

BACKGROUND OF THE INVENTION

Communication between electronic control devices as well as control and monitoring of sensors and actuators in motor vehicles are now increasingly being handled by bus systems, an example of which is the controller area network (CAN) bus. In these systems, electrical signals are transmitted via electrical lines between a sending and a receiving bus station. During operation, such lines are susceptible to damage due to mechanical load or other influences, leading to transmission faults. Damaged lines should no longer be used in a bus system, but conventional systems have only limited ability to detect faults on the lines of a bus system. Thus, the options for reacting to a detected fault are limited, for example, to disconnecting the damaged section. Furthermore, conventional mechanisms for testing bus lines are limited to measuring the voltage of the bus lines. This has the disadvantage that bus lines, which tend to oscillate because of a particular line length, cannot be monitored reliably for faults. Examples of such faults are short circuits to external voltages (such as the supply voltage) or short circuits to ground.

SUMMARY OF THE INVENTION

Generally speaking, it is an object of the present invention to improve over existing means and methods for detecting faults in bus systems.

In accordance with exemplary embodiments of the present invention, an electrical switching circuit for operating a bus of a field bus system includes means for determining a fault of the bus, especially a fault current. The means for determining the fault can contain first means for determining a first current of a first bus line, second means for determining a second current of a second bus line and detecting means for detecting a fault based on the first and second currents.

The present invention can be used in principle for all multi-conductor buses in which total currents are to be monitored, and is particularly suited for bus systems having two-conductor lines. These include the CAN bus and the RS 485 bus.

In many field bus systems, such as the CAN bus, transmission of control and data information between the bus stations is provided via two-conductor or multi-conductor bus lines to which the bus stations are coupled. During undisturbed operation, a definite current flows into a first line of the bus (or part of the bus) and a second current of equal value flows back out via a second line of the bus. Thus, the current is dispatched via one line in one direction and returns via a terminating resistor on the second line. In accordance with exemplary embodiments, the present invention proposes determining the two currents and detecting a fault of the bus on the basis of this measurement. In contrast to conventional methods, therefore, no voltage measurement is made in the bus lines. Instead, the currents are measured on the lines. Thereby, it is ensured, especially in the case of long bus lines, that oscillation tendencies of the bus lines do not make the measurements unreliable or make them require a disproportionately long time. In addition, certain faults cannot be determined by a pure voltage measurement under certain boundary conditions.

Embodiments of the present invention are applicable to all bus systems in which a definite current flows on a first bus line in one direction and on a second bus line in the opposite direction. The means for determining the currents can be formed advantageously as shunt resistors, for example, and coupled directly to the respective bus line. The voltage, which drops across the resistors, yields the current through the bus line. Other options for determining the current are based on inductive coupling, for example with reed sensors. The means for detecting the fault are implemented on the basis of the respective measurement technique by comparing voltages based on the currents. For example, it is possible for this purpose to use comparators, which compare the corresponding voltage values.

According to an advantageous embodiment of the present invention, a driver stage for driving a bus line is configured and used as a means for determining a current of the bus line. Accordingly, no actual additional component such as the shunt resistor mentioned above is integrated into the bus line. Instead, a component of a driver stage is used. Such a driver stage is advantageously a component provided for operation of the bus line in the intended manner. Such components may be found, for example, in what are known as CAN transceivers, which provide the connection between a CAN controller for the bus protocol and the two bus lines or a plurality of bus lines. The data exchange between the bus stations is achieved via the interface provided by the CAN transceiver. Similar components are used in other bus systems, which can benefit in the same way from the present invention. In the case of a CAN bus, the sending part contains a driver for each bus line and a driver-control switching circuit. A high-side driver is coupled with the supply voltage of the CAN transceiver and allows current to flow into the first bus line. A low-side driver is coupled with ground and receives the current from a further bus line. In general, components are connected directly in the current-carrying path of the bus lines in the case of such driver stages. These components are used for determining the current. This is possible, for example, by using the voltage drop across the components to determine the current. In particular, in an advantageous embodiment, a driver transistor of the driver stage is used as the means for determining a current.

According to a further advantageous embodiment of the present invention, a protective diode of a driver stage coupled to a bus line is used for determining the current. The advantage of such an arrangement is that the protective diode is capable of greatly enhancing the measurement sensitivity by virtue of a nonlinear characteristic. Thus, even small deviations from a desired current can already be detected. The same is true for transistors that behave as diodes or other electrical components having nonlinear behavior. For this purpose, it is possible, for example, to position the diode or the transistor in the feedback branch of an amplifier circuit, such as a voltage follower or similar device.

According to a further advantageous embodiment of the present invention, comparing means for comparison of voltage values are provided in the electrical switching circuit, the voltage values being based on the first current and the second current and the comparing means being configured so as to execute at least two separate comparison operations. A plurality of comparison operations can be executed, thus permitting correlation of faults with particular fault types on the two bus lines. For example, it is possible to identify short circuits of each individual line to ground or to external voltages as well as short circuits to one another or line breaks. This is possible because more than one comparison can take place.

In an advantageous embodiment of the present invention, the electrical switching circuit is configured to determine the fault as a function of the sending condition of the bus. Thereby, it is ensured that a predefined operating condition of the bus lines is achieved, thus facilitating determination of the specific faults. In the CAN bus, for example, a distinction is made between dominant and recessive bus conditions. A recessive condition exists if all drivers of all bus stations connected to the bus are passive. The bus then exhibits a specific potential of the lines. When at least one of the drivers of a bus station is active, this represents a dominant condition. In the dominant condition, a specific potential difference exists between the bus lines. Moreover, a definite current flow is obtained in this operating condition. It is advantageous to determine the fault in dominant sending operation because, in this condition, the currents propagate as intended on the lines in the manner defined above. If the current or currents on the lines deviates or deviate from the specifications, determination of a fault current is possible in the dominant condition.

According to another advantageous embodiment of the present invention, the electrical switching circuit provides for disconnection of one or more defective bus lines as the reaction to a fault of the bus. These bus lines are no longer used for further data transmission. Instead, it can be advantageously provided that defective bus lines for which a fault has been detected will be replaced by functional redundant bus lines. This exemplary aspect of the present invention is particularly suited for multi-channel bus systems, in which a plurality of separate buses is present.

According to a further advantageous embodiment of the present invention, the means for detecting the electrical switching circuit are configured to detect a short circuit of one of the bus lines to ground or a short circuit of one of the bus lines to an external voltage. In particular, detection of both faults is also provided by the inventive configuration of the electrical switching circuit. Since the currents are determined on the bus lines, certain types of faults of the bus system can be distinguished by comparison of the currents in terms of their absolute and relative values. Thus, it is possible not only to sense that a fault exists, but also to assign such a fault to a particular defect. This permits flexible reaction to the fault. Moreover, a diagnosis of the bus system is already obtained in this way.

The object of the present invention is also achieved by a method for determining a fault in a multi-channel bus system, which includes the following steps: determining a first current of a first bus line, determining a second current of a second bus line, comparing values derived from the first and second currents, and outputting a comparison result that corresponds to a fault on the bus lines, the first bus line and the second bus line being two bus lines of a common bus section of a bus system. It is therefore possible in general to determine the faults that may occur on a bus section of a multi-channel bus system, which section is composed of at least two electrical lines. In this way, transmission of control and data information between the bus stations is provided for certain bus systems, such as, for example, the CAN bus. In undisturbed operation, a definite current flows into a first line of the bus section and a current of equal value flows out via a second line of the bus section. According to embodiments of the present invention, this symmetry can be used to determine short circuits or breaks of the bus lines.

According to a farther advantageous embodiment of the present invention, the comparison step comprises at least one first comparison and one second comparison, the first comparison being provided in order to determine a first fault condition of the bus and the second comparison being provided in order to determine a second fault condition of the bus. The first and second fault conditions pertain to different physical defects of the bus.

On the basis of the foregoing, it should be appreciated that the inventive method is suitable for distinguishing a plurality of different fault situations on a bus. Thus, not only can the bus lines be tested for values above or below preselected levels, but, in addition, short circuits of the two bus lines individually or relative to one another can be ascertained. Furthermore, the disadvantages of a voltage measurement are avoided by the measurement of currents passing on the bus lines. This has the positive consequence that even long bus lines, which may exhibit oscillating behavior, can be tested reliably. In particular, a short circuit to ground can also be recognized. Moreover, it is also possible to detect unilateral short circuits of a bus line to an external voltage or to ground, which may lead to communication faults.

According to a further advantageous embodiment of the present invention, a first comparison voltage based on the mean value of the two voltages of the bus lines is compared in the first comparison with a second comparison value based on a combination of the mean value of the voltages on the bus lines and voltages derived from currents through the first and second bus lines.

In an inventive switching circuit according to exemplary embodiments of the present invention, the operations relative to a CAN bus can be described as follows. During a short circuit of a second bus line to ground, the current flows from the first bus line via the bus to the second bus line and from there directly to ground. This means that the current does not take the regular path via the bus lines. If a ("second") sensing means (such as, for example, a shunt resistor) is coupled into the second line, less current flows via the second sensing means. Consequently, the voltage ratio shifts to the effect that a second comparison voltage at the second sensing means assumes a lower value. As a result, the output of the second comparison means switches from a first to a second output condition, for example from high to low. An analogous operation can be observed when a short circuit of the first bus line to ground is present. In the case of a short circuit of the first bus line to an external voltage, no current flows through the first sensing means, which is coupled to the first bus line. Via the bus, a fault current flows out from the position of the short circuit from the first bus line to the second bus line and, from there, via the second sensing means back to ground. Consequently, the voltage ratio at the comparison means is shifted, to the effect that the second comparison voltage assumes a higher value. As a result, the output of the first comparison means switches from a first to a second logical condition, for example from high to low. The circuit behaves in exactly the same way in the case of a short circuit of the second bus line to an external voltage.

In the recessive condition, currents do not flow through either the first or the second sensing means. The sensing means are disposed in such a way that they can sense the currents in the bus lines. For this purpose, the sensing means can be connected as shunt elements (resistor, diode, transistor, etc.) in the lines. Advantageously, they are disposed between the drivers and the terminal points for the lines. As discussed above, the sensing means can also be implemented as parts of the driver stages, for example by determining a voltage drop across a transistor of the driver stage.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention will be discussed hereinafter on the basis of exemplary embodiments with reference to the accompanying drawings, wherein.

DETAILED DESCRIPTION OF THE PREFERRED EMBODIMENTS

Figure 1:
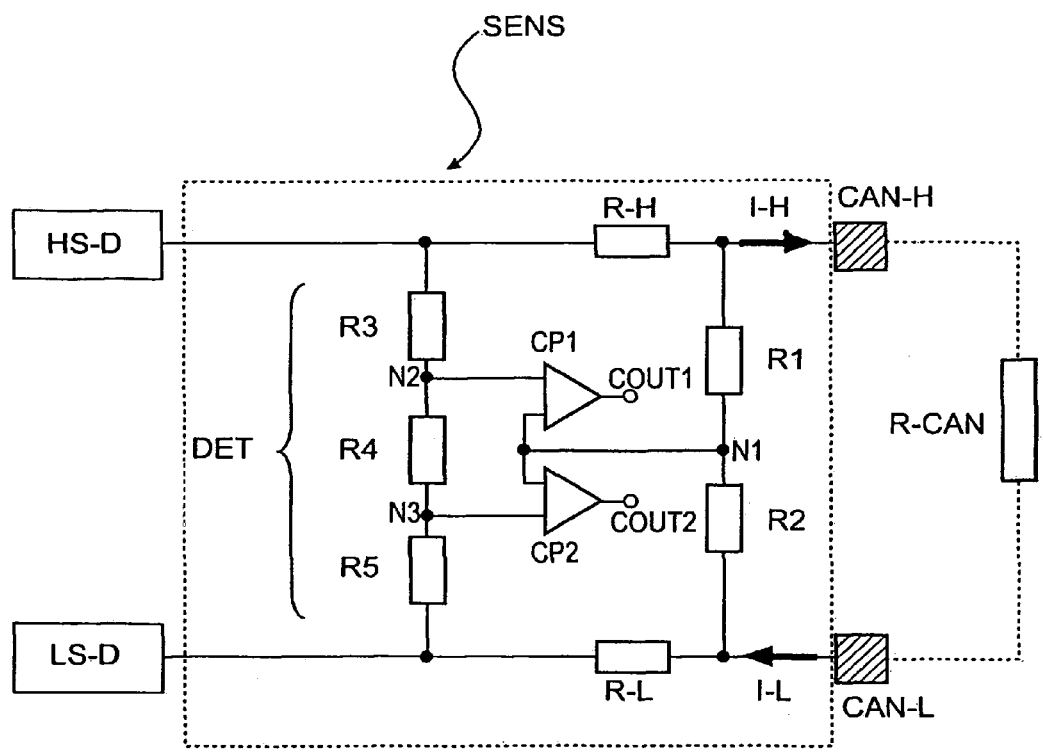
FIG. 1 is a simplified circuit diagram of an electrical switching circuit according to an exemplary embodiment of the present invention.

Referring now to the drawing figures, FIG. 1 is a simplified circuit diagram of an electrical switching circuit according to an exemplary embodiment of the present invention. A fault-detection switching circuit SENS is disposed between the two transmission lines CAN-H, CAN-L of a CAN bus system. In a typical CAN bus system, a plurality of two-conductor transmission sections is provided, each having two transmission lines CAN-H, CAN-L. Line CAN-H is coupled to an output driver known as high-side driver HS-D. This generates voltage and/or current levels according to a standardized specification. The same is true for transmission line CAN-L, which is coupled to a corresponding driver LS-D (low-side driver). Resistors R-H and R-L are coupled as first and second sensing means to lines CAN-H and CAN-L. A detecting means, namely switching circuit DET, is connected to these resistors for detecting a fault or for detecting fault currents. The mean voltage value at node N1 is formed via voltage divider R1/R2. This value is supplied to comparators CP1 and CP2, which operate as comparing means, respectively, at a positive and a negative input. The respective other terminals of comparators CP1 and CP2 receive their voltages from a resistor series R3, R4 and R5. According to an advantageous embodiment of the present invention, the resistances of R1 and R2 have the same value, and so, within certain tolerances, exactly the mean potential of the two voltages on lines CAN-H and CAN-L is present at node N1. Voltage divider R3, R4 and R5 is dimensioned such that the voltages at nodes N2 and N3 deliver a constant predefined output signal relative to the potential at node N1 during normal operation, or, in other words, in the absence of a fault. In the present case, comparators CP1 and CP2 have a logical high or "1" level at their respective outputs COUT1 and COUT2. In this regard, it is considered according to the present invention that, in normal operation, a current flowing into line CAN-H corresponds in magnitude to the current exiting in this part of the bus section via line CAN-L. For this purpose, the current is returned via a terminating resistor R-CAN. As long as the aforesaid condition of normal operation is satisfied, the input voltages for the comparators are in a ratio relative to one another that forces the outputs COUT1 and COUT2 of comparators CP1 and CP2 into a condition defined as normal condition or fault-free condition.

If a fault now develops in the dashed area, or, in other words, outside the fault-detection switching circuit SENS of the bus section (for example, due to a short circuit to ground or a short circuit to an external voltage), it will cause a difference to appear between the two currents on the CAN-H and CAN-L lines. The voltage dividers between the lines react to a fault condition by changed node voltages at nodes N1, N2 and N3. If the fault exceeds a certain limit value, the node voltages N1, N2 and N3 change so much that comparators CP1 and CP2 react thereto by reversing the outputs COUT1 and COUT2. In total, the two outputs COUT1 and COUT2 of the comparators can assume three different conditions in combination. Thus, it is possible to detect, for example, one normal condition and two different fault conditions in total. In the case of a short circuit of CAN-L to ground, the current flows from CAN-H via the bus to CAN-L and from there directly to ground and therefore not via R-L, Thereby, the voltage ratio is shifted, and, so, the second comparison voltage N3 at comparator CP2 assumes a lower value. As a result, the output COUT2 of comparator CP2 switches from high to low. The circuit behaves analogously in the case of a short circuit of CAN-H to ground. In the case of a short circuit of CAN-H to an external voltage, no current flows through R-H. Via the bus, a fault current flows from the short circuit at CAN-H to CAN-L, and from there, via R-L back to ground. Thus, the voltage ratio is shifted such that the second comparison voltage COUT2 at second comparator CP2 assumes a higher value. As a result, the output COUT1 of comparator CP1 switches from high to low. The circuit behaves analogously in the case of a short circuit of CAN-L to an external voltage. In the recessive condition, currents do not flow through R-H or R-L.

Figure 2:
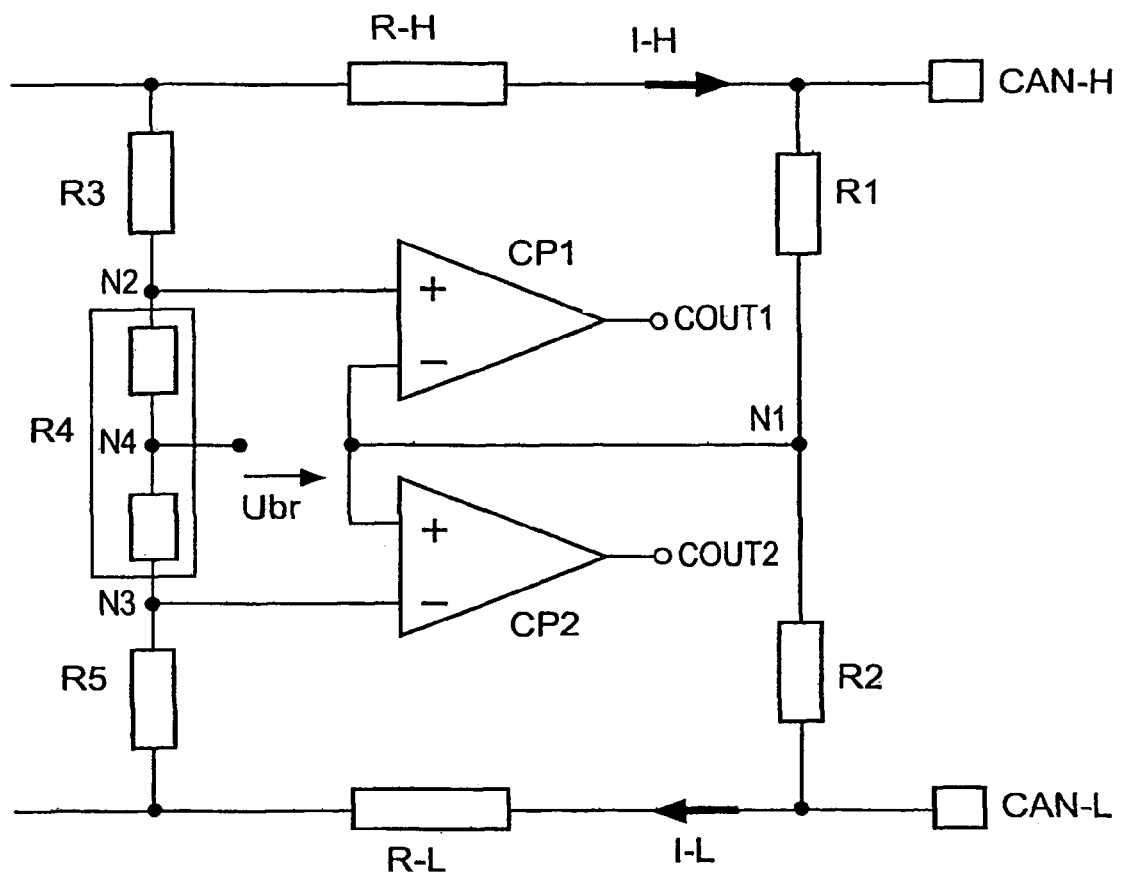
FIG. 2 is a simplified circuit diagram of a switching circuit according to another embodiment of the present invention.

For further illustration of the functional principle, FIG. 2 shows a simplified circuit diagram of a switching circuit according to an advantageous embodiment of the present invention. The circuit is largely identical or similar to the switching circuit described above with reference to FIG. 1. In addition, resistor R4 is now divided into two parts, thus offering the possibility of tapping a node voltage N4. The bridge voltage Ubr is present between nodes N1 and N4. If the current through R-H is exactly as large as the current through R-L and the currents are flowing in opposite directions in normal operation, as described above, the bridge voltage Ubr is zero. However, if the current through R-H (the outwardly flowing current) is larger than the current through R-L (the inwardly flowing current), the (virtual) bridge voltage Ubr becomes positive. If Ubr exceeds a threshold value, comparator CP2 is reversed. In this way, it is indicated that the fault current $I_{fault}=+I-L$ is too large and a connection to an external potential exists. Comparator CP2 generates the complementary fault signal. This means that it indicates when the fault current exhibits the reversed sign.

Figure 3:
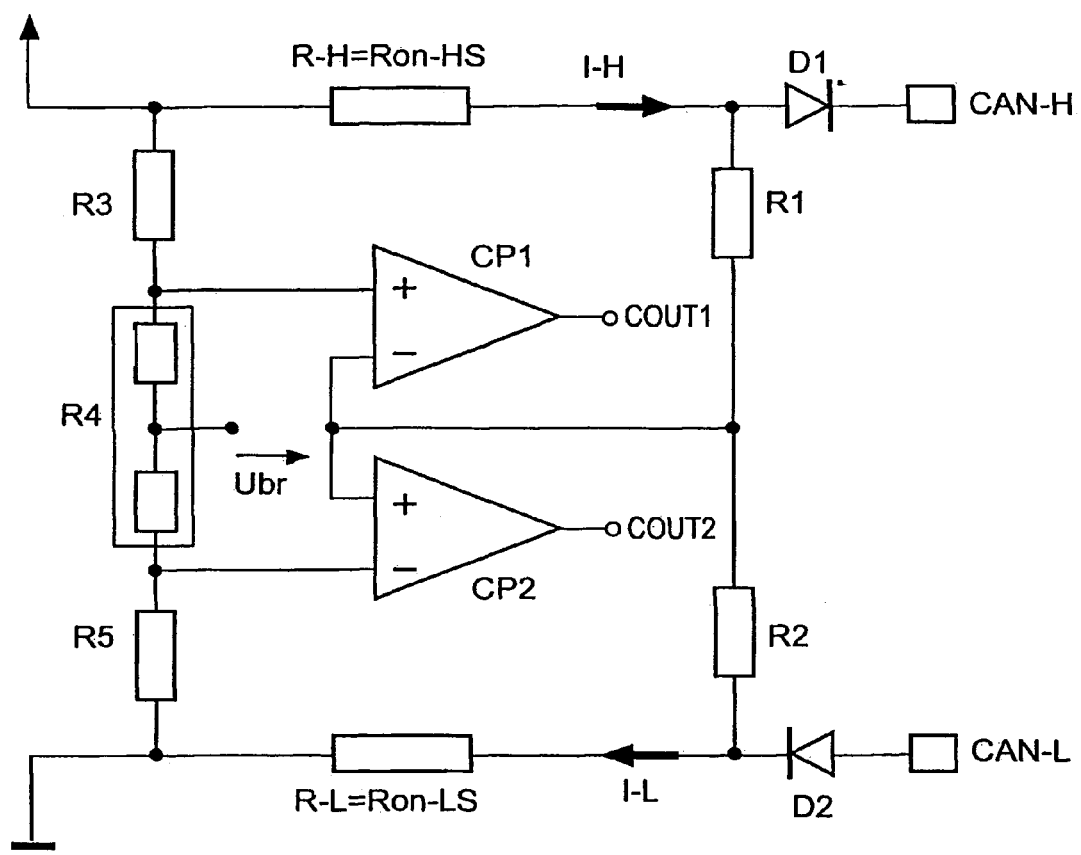
FIG. 3 is a simplified circuit diagram of a switching circuit according to a further embodiment of the present invention.

FIG. 3 is a simplified circuit diagram of a further advantageous embodiment of the present invention. The circuit according to FIG. 3 has substantially the same layout as the circuit of FIGS. 1 and 2. In addition, diodes D1 and D2 are now provided. Since a current total is monitored exclusively in dominant condition of output drivers HS-D and LS-D, the high-side and low-side switches can be used as bridging elements (shunts). Correspondingly, the resistor R-H is the conducting resistor Ron-HS of the high-side driver transistor HS-D. Second resistor R-L is implemented by the conducting resistor Ron-LS of the low-side driver transistor.

The CAN bus is able to occupy two conditions: a recessive and a dominant condition. The recessive condition exists when all drivers of the components connected to the bus (typically transceivers) are passive, meaning that none of the drivers is in sending condition. In this situation, the difference voltage between the two bus lines is approximately 0 V. The possible tolerances of the voltage in the recessive condition are standardized (ISO 11898). Accordingly, the voltage levels may lie between approximately −50 mV and +500 mV. The logical level assigned to this condition is defined as the high level or logical "1". As soon as at least one driver on the bus switches to active condition, the entire bus is said to be dominant. The difference voltage on the bus is then typically 2.25 V, although this voltage can also vary within a definite range. Accordingly, the voltage can assume values between 1.5 and 3 V. This dominant condition is defined as logical "0" or low level. Diodes D1 and D2 are the protective diodes of high-side driver HS-D and of low-side driver LS-D. By means of appropriate coupling, these may be disposed outside the circuit, or, in other words, between the outputs of the circuit and the bus lines CAN-H, CAN-L to be sensed. In this advantageous embodiment, the voltage divider comprising R3, R4 and R5 is continuously supplied with voltage. As a result, definite reference voltages are present at the comparator inputs in the recessive condition, thus permitting fault sensing even in the recessive condition. Another exemplary arrangement is presented in FIG. 4.

Figure 4:
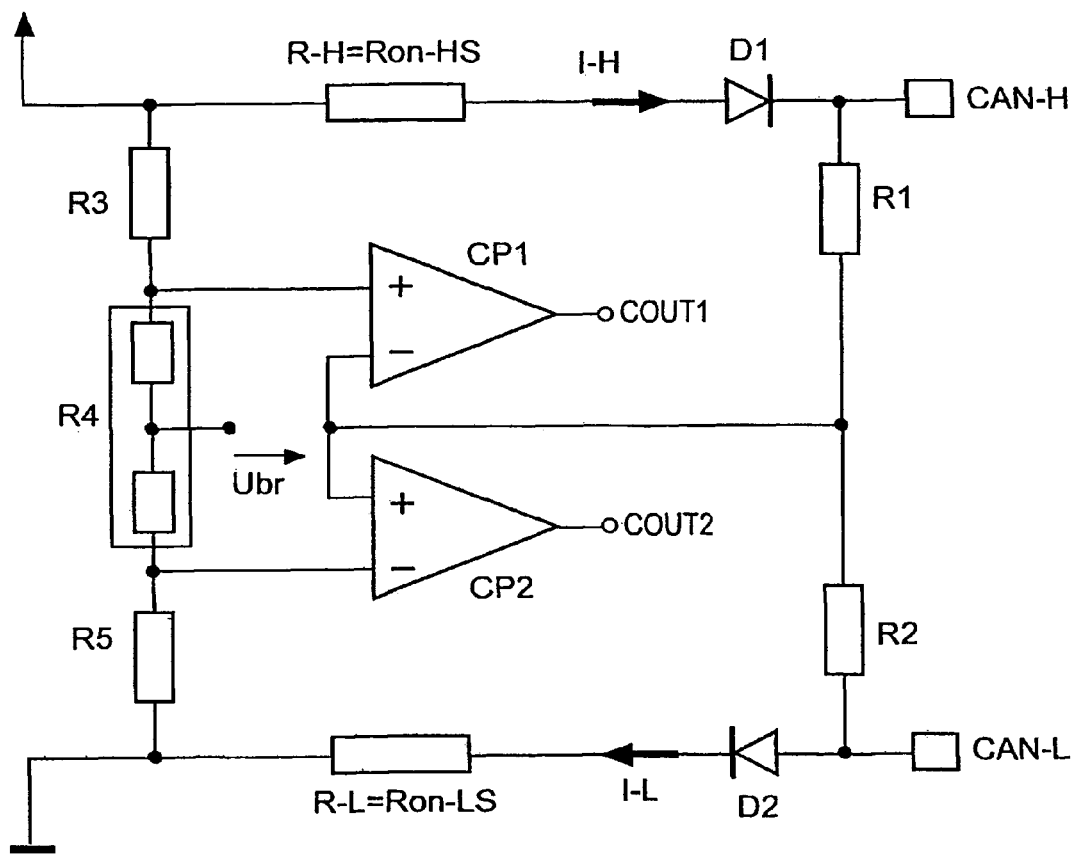
FIG. 4 is a simplified circuit diagram of a switching circuit according to another embodiment of the present invention.

FIG. 4 shows a further advantageous embodiment of the present invention. In this advantageous configuration, not only are the resistors R-H and R-L (according to FIG. 1) implemented by the conducting resistors of the driver stages Ron-HS, Ron-LS, but, also, the diodes (protective diodes of the driver stages) D1 and D2 are additionally incorporated into the bridging path, in the bridge branches. This embodiment is therefore particularly advantageous because the non-linear diode characteristic leads to enhanced sensitivity at very low fault currents through the diodes. The voltage divider comprising R3, R4 and R5 is continuously supplied with voltage. As a result, definite reference voltages are present at the comparator inputs in the recessive condition, thus permitting fault sensing even in the recessive condition.

Figure 5:
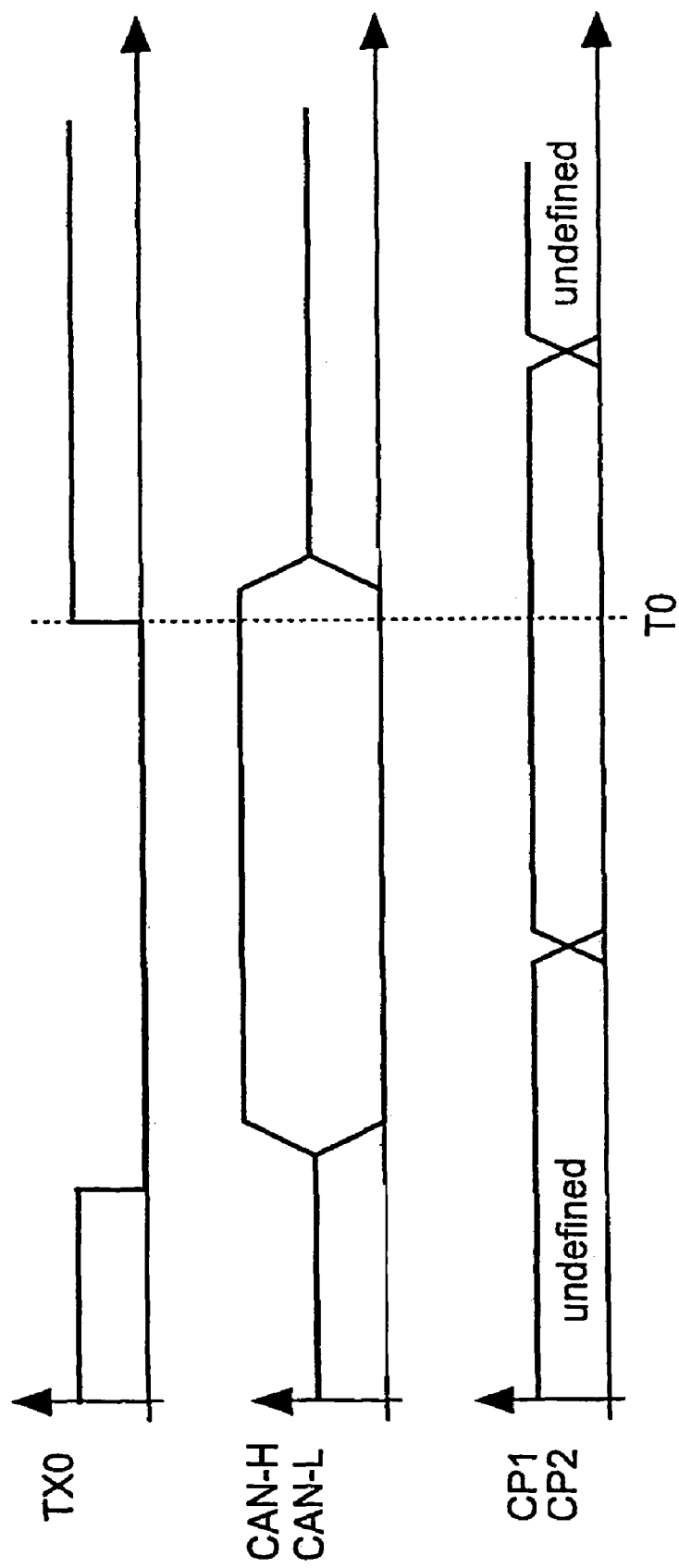
FIG. 5 is a timing diagram illustrating levels on a bus system.

FIG. 5 shows the time profiles of the signals on bus lines CAN-H and CAN-L. Also illustrated are a logic signal TX0 and the signals at comparators CP1 and CP2. As long as no sending operation is taking place, meaning that TX0 is at logical high, the comparators in the configurations according to FIG. 1 and FIG. 2 are in an undefined condition. As soon as TX0 initiates sending operation, the bus switches from the recessive to the dominant condition. At instant T0, an initial value of comparators CP1 and CP2 can be tapped and a fault on one of the bus lines can be determined on the basis of these values. According to exemplary embodiments of the present invention, such fault detection, or, in other words, the determination of a fault of the bus lines, takes place as a function of the operating condition of the bus.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. An electrical switching circuit for operating a bus of a field bus system, said electrical switching circuit comprising a sensor for sensing a fault current, said sensor comprising:
   a first sensing unit for determining a first current present on a first bus line,
   a second sensing unit for determining a second current present on a second bus line, and
   a fault detector for detecting a fault based on said first current and said second current, said fault detector comprising (i) a voltage divider connected between said first bus line and said second bus line, said voltage divider being formed from a plurality of resistors and having a plurality of nodes between said plurality of resistors, and (ii) a plurality of comparators each coupled to a respective node of said plurality of nodes, wherein at least one of said first sensing unit and said second sensing unit includes a driver stage for driving at least one of said first and second bus lines.

2. The electrical switching circuit according to claim 1, wherein said driver stage includes a driver transistor operable to determine at least one of said first current and said second current.

3. The electrical switching circuit according to claim 1, wherein said driver stage includes a protective diode coupled to at least one of said first and second bus lines and operable to determine at least one of said first current and said second current.

4. The electrical switching circuit according to claim 1, wherein at least one of said first sensing unit for determining a first current and said second sensing unit for determining a second current includes an electrical resistor coupled to at least one of said first and second bus lines.

5. The electrical switching circuit according to claim 4, wherein said electrical resistor comprises a conducting resistor of a driver transistor.

6. The electrical switching circuit according to claim 1, wherein said fault detector is operable to detect at least one of a short circuit of at least one of said first and second bus lines to ground and a short circuit of at least one of said first and second bus lines to an external voltage.

7. The electrical switching circuit according to claim 1, wherein said fault detector includes at least one comparator operable to compare voltage values based on said first current and said second current, and wherein said at least one comparator is operable to execute at least two separate comparison operations.

8. The electrical switching circuit of claim 1, wherein said voltage divider and each of said plurality of comparators is continuously supplied with a predefined voltage such that said fault detector is capable of detecting said fault when said driver stage is driving said at least one of said first and second bus lines and when said driver stage is not driving said at least one of said first and second bus lines.

9. A method for determining a fault during operation of a field bus system, said method comprising the steps of:
   driving, using a first driver stage, a first bus line,
   driving, using a second driver stage, a second bus line,
   determining a first current that is present on said first bus line using said first driver stage,
   determining a second current that is present on said second bus line using said second driver stage,
   comparing, using a fault detector comprising (i) a voltage divider connected between said first bus line and said second bus line, said voltage divider being formed from a plurality of resistors and having a plurality of nodes between said plurality of resistors, and (ii) a plurality of comparators each coupled to a respective node of said plurality of nodes, values derived from said first current and said second current to identify a fault current, and displaying said fault when said step of comparing values derived from said first current and said second current indicates a fault current, said first bus line and said second bus line being two bus lines of a common bus section of said bus system.

10. The method according to claim 9, wherein said step of comparing values derived from said first and said second current includes a first comparison and a second comparison, said first comparison being capable of indicating a first fault condition of said bus system, said second comparison being capable of indicating a second fault condition of said bus system.

11. The method according to claim 9, wherein said step of comparing values derived from said first and second currents to identify a fault current is a function of a sending condition of said bus system.

12. The method of claim 9, wherein said voltage divider and each of said plurality of comparators is continuously supplied with a predefined voltage such that said fault detector is capable of detecting said fault when at least one of said first stage and said second stage is driving at least one of said first and second bus lines and when said at least one of said first stage and said second stage is not driving said at least one of said first and second bus lines.

13. A method for determining a fault during operation of a field bus system, said method comprising the steps of
determining a first current of a first bus line,
determining a second current of a second bus line,
comparing values derived from said first current and said second current to identify a fault current, and
displaying said fault when said step of comparing values derived from said first current and said second current indicates a fault current, wherein said first bus line and said second bus line are two bus lines of a common bus section of said bus system, wherein said step of comparing values derived from said first current and said second current comprises a first comparison and a second comparison, said first comparison being capable of indicating a first fault condition of said bus system, said second comparison being capable of indicating a second fault condition of said bus system, and wherein said first comparison comprises the step of comparing a second value and a first value, said second value corresponding to the mean value of voltages on said first bus line and on said second bus line plus an offset voltage, said first value corresponding to a combination of the mean value of the voltages on said first and second bus lines and voltage derived from the current of said first bus line.

14. The method according to claim 5, wherein said second comparison includes the step of comparing said first value and a third value, said third value corresponding to the mean value of voltages on said first bus line and on said second bus line plus an offset voltage, said first value corresponding to a combination of the mean value of the voltages on said first and second bus lines and voltage derived from the current of said second bus line.

15. An electrical switching circuit for operating a bus of a field bus system including electrical bus lines, said switching circuit comprising a fault detection circuit operable to sense a fault current, said detection circuit including a first current sensing device for determining a first current that is present on a first bus line of said electrical bus lines, a second current sensing device for determining a second current that is present on a second bus line of said electrical bus lines, wherein at least one of said first current sensing device and said second current sensing device comprises a driver stage for driving at least one of said first and second bus lines, and a fault detector for detecting a fault based on said first current and said second current, wherein said fault detector comprises (i) a voltage divider connected between said first bus line and said second bus line, said voltage divider being formed from a plurality of resistors and having a plurality of nodes between said plurality of resistors, and (ii) a plurality of comparators each coupled to a respective node of said plurality of nodes.

16. The electrical switching circuit of claim 15, wherein said voltage dividing circuit and each of said plurality of comparators is continuously supplied with a predefined voltage such that said fault detector is capable of detecting said fault when said driver stage is driving said at least one of said first and second bus lines and when said driver stage is not driving said at least one of said first and second bus lines.

* * * * *